United States Patent [19]

Helton

[11] Patent Number: 4,503,782
[45] Date of Patent: Mar. 12, 1985

[54] WOOD STOVE GRATE KIT WITH LOW WOOD SIGNAL

[76] Inventor: Marty D. Helton, 280 Lake St., Sand Lake, Mich. 49343

[21] Appl. No.: 484,434

[22] Filed: Apr. 13, 1983

[51] Int. Cl.³ .............................................. F23N 5/18
[52] U.S. Cl. ........................ 110/186; 110/101 CC; 126/152 B; 126/153; 126/164
[58] Field of Search ........ 110/101 R, 101 C, 101 CC, 110/101 CF, 108, 118, 185, 186, 192, 293; 126/152 R, 152 B, 153, 164, 165

[56] References Cited

U.S. PATENT DOCUMENTS

| 1,561,543 | 11/1925 | Hoult | 126/153 |
| 1,826,106 | 10/1931 | Vodoz | 110/101 CC |
| 2,376,079 | 5/1945 | Orphan | 110/101 CD |
| 3,921,545 | 11/1975 | Ruegsegger | 110/186 |
| 4,339,998 | 7/1982 | Finch | 110/186 |

FOREIGN PATENT DOCUMENTS 169514  10/1982  Japan ........................ 110/101 CC Primary Examiner—Edward G. Favors
Assistant Examiner—Steven E. Warner
Attorney, Agent, or Firm—Price, Heneveld, Huizenga & Cooper

[57] ABSTRACT

The specification discloses a grate replacement kit for a solid fuel burning firebox. The kit includes an extendable grate, adaptable to a variety of different size fireboxes, and a scale to be mounted on the outside of the firebox. Further included is a hinge assembly for pivotally mounting one end of the grate to the firebox with the opposite end of the grate operatively supported by the scale. The scale is responsive to the weight of the grate and any fuel supported thereon to indicate when restoking is required to prevent the fire from burning out. Preferably, a signal device responsive to the scale is included to emit a signal in a location remote from the firebox when additional wood is required.

13 Claims, 6 Drawing Figures

WOOD STOVE GRATE KIT WITH LOW WOOD SIGNAL

BACKGROUND OF THE INVENTION

The present invention relates to solid fuel burning stoves, and more particularly to a grate assembly for a solid fuel burning stove.

Because of the recent skyrocketing costs of energy, such as oil, gas, and electricity, many homeowners have installed wood burning furnaces or stoves in their homes to reduce their home heating costs. Typically, these stoves include an airtight firebox in which the wood or other solid fuel is combusted and a grate supported within the box to in turn support the wood during combustion. The heat resulting from combustion of the wood is distributed by convection and, in some units, by blowers incorporated in the wood stove.

Although reducing heating costs for homeowners having a readily available supply of relatively inexpensive wood, these stoves are not without their inconveniences and drawbacks. First, and perhaps most significantly, the wood stove must be periodically and repetitively checked to determine whether it requires stoking, or replenishing with wood, to maintain the fire within the firebox. Second, if too much wood is placed in the firebox, a large proportion of the heat passes through the flue so that the stove is not as efficient as desirable. However, homeowners often overfill the firebox to reduce the frequency of restoking the fire therein. The chore of checking the fire is a relatively bothersome task and continually interrupts the homeowner's life as he must periodically proceed to the wood stove at often inconvenient times to check the wood supply therein. Of course, the wood stove must be checked more often than is actually necessary for restoking to insure that the fire does not burn too low or even burn out.

Artisans have attempted to develop a workable low wood signal system for a solid fuel burning stove, for example as shown in U.S. Pat. No. 4,339,998, entitled FUEL LEVEL INDICATOR, and issued July 20, 1982, to Finch. The Finch device includes a grate pivotally supported within the firebox on a spring-loaded axle and a switch responsive to rotation of the axle for actuating a signaling device or automatic feeder. When the grate is fully loaded with wood, the switch is open so that the signaling device and feeder are dormant. However, as wood is consumed, the grate pivots upwardly to close the switch and actuate the signaling device and feeder. The Finch device has at least two significant drawbacks. First, the grate must be specially sized and adapted for each individual firebox in which the kit is to be installed, creating tremendous inventory and stocking problems. Second, because the spring-loaded switch is responsive to the rotation of the fixed axle, it appears that the switch tends to be somewhat inaccurate, sometimes (1) indicating that the fire requires restoking when it does not and (2) failing to indicate that the fire requires restoking when it has burned too low to kindle additional wood.

SUMMARY OF THE INVENTION

The aforementioned problems are solved by the present invention. Essentially, a grate kit for a solid fuel burning stove is provided which is adaptable to virtually any known size stove and accurately produces a signal to the homeowner when the stove requires additional fuel. More specifically, the kit includes an extendable grate and a hinge assembly for pivotally mounting the grate to one wall of the firebox. The kit further includes a spring-loaded scale mountable on the opposite wall of the firebox, and the free end of the grate is supported on the scale so that the scale provides a reading indicative of the weight of the grate and any solid fuel supported thereon. A signal device responsive to the scale is included to provide a signal to the homeowner when the grate acquires a preselected minimum weight indicating that the remaining wood on the grate is the minimum required to rekindle additional wood.

The grate kit assembly of the present invention totally eliminates the bothersome chore of periodically checking the stove to determine the condition of the fire. The reliability of the kit assembly is high because the weight of the grate and wood supported thereon is measured at the free end of the pivoting grate directly as a weight and not as a torque about a pivoting grate axle. When the stove is used, the homeowner simply builds a fire in the stove and returns to any activity within the home. As the wood burns, the products of combustion pass up the flue and the ash drops through the grate, so that the weight of the grate and wood on the scale is reduced. When the grate and wood achieve a predetermined minimum weight, the signal device emits a visual or audible signal indicating that the minimum amount of wood remains required to rekindle additional wood. Consequently, the homeowner receives a signal from the grate kit only when it is necessary to restoke the fire, completely eliminating the necessity of making unrequired trips to the wood burning stove. Additionally, the extendability of the grate enables the grate kit to be mounted on virtually any size firebox.

In a preferred embodiment of the invention, the signal device is adjustable to be responsive to different grate weights. Therefore, the homeowner can preselect the weight of wood on the grate which will actuate the signal device. A relatively low weight is selected when the wood to be burned is dry and easily rekindled. A relatively high weight is selected when the wood to be burned is wet and difficult to rekindle. The adjustability of the triggering wood weight enables the homeowner to optimize actuation of the signal device.

These and other objects, advantages, and features of the invention will be more fully understood and appreciated by reference to the written specification and drawings.

DETAILED DESCRIPTION OF THE PREFERRED EMBODIMENT

Figure 1:
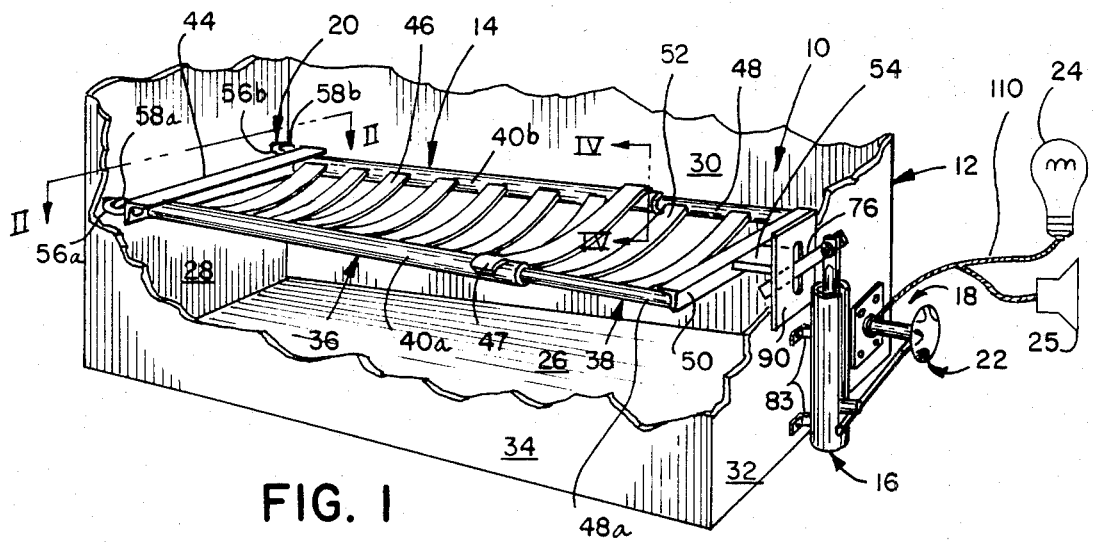
FIG. 1 is a fragmentary, perspective view of the grate kit of the present invention installed on a solid fuel burning firebox.

A wood grate insert kit is illustrated in the drawings and generally designated 10. As most clearly seen in FIG. 1, kit 10 is installed on solid fuel burning firebox 12 and generally includes extendable grate 14, scale 16, and signal apparatus 18. Grate 14 is pivotally supported within firebox 12 on hinge assembly 20 and is also supported on scale 16. Therefore, scale 16 is responsive to the weight of grate 14 and any solid fuel supported thereon. Signal device 18 includes dial assembly 22 and light 24 and buzzer 25 both electrically connected to the dial assembly. Dial assembly 22 can be rotated to select the weight at which scale 16 engages the dial assembly to complete an electric circuit through lamp 24 and buzzer 25.

Having briefly described the overall construction of kit 10, the individual subassemblies, components, and elements thereof will now be described in detail.

Firebox 12 (FIG. 1) is generally well-known to those having ordinary skill in the art and is of the type generally found in a wood stove or wood furnace. Generally, firebox 12 comprises a floor 26 and four walls 28, 30, 32, and 34 extending upwardly therefrom and interconnected to define a square prism. An opening (not shown) is defined in at least one of the firebox walls through which wood may be inserted and placed on grate 14. As is well known, the opening is removably covered, for example by a hinged door.

Figure 4:
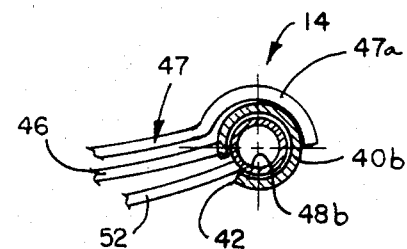
FIG. 4 is a fragmentary, sectional view taken along plane IV—IV in FIG. 1.

Grate 14 (FIG. 1) comprises pivoted half 36 supported on wall 28, and scale half 38 supported on scale 16. Pivoted half 36 in turn comprises a pair of parallel spaced side tubes 40a and 40b, both of which are generally C-shaped in cross section defining longitudinal slits or openings 42 (see also FIG. 4). Side tubes 40 are joined, for example by welding, to angle iron 44, and a plurality of wood-supporting straps 46 extend between and are supported by side tubes 40 to face concave upwardly. Additionally, one or more removable straps 47 (see also FIG. 4) are supported on hooked ends 47a between the grate side tubes and are movable therealong to provide additional wood support. Support half 38 also comprises a pair of parallel side tubes 48 both of which are generally cylindrical in cross section (see also FIG. 4). Tubes 48 are interconnected, for example by welding, to angle iron 50, and a plurality of wood supporting straps 52 extend between and are supported by side tubes 48 to face concave upwardly. Side tubes 48a and 48b are slidingly received within side tubes 40a and 40b, respectively (FIG. 4). Straps 52 on grate half 38 ride within slits 42 defined by opposite side bars 40 to permit the two grate halves 36 and 38 to telescope with respect to one another. In the preferred embodiment, grate 14 is extendable between lengths of 22 inches and 32 inches and is approximately $9\frac{5}{8}$ inches wide to be adaptable to most known size fireboxes. Angle iron 50 supports an arm 54 which is supported on scale 16.

Figure 2:
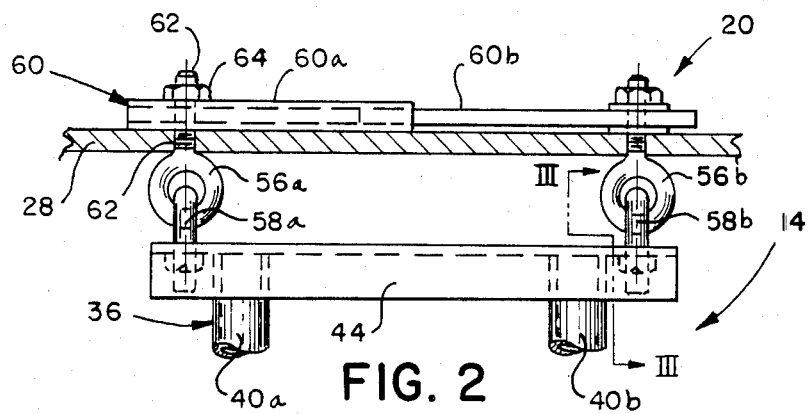
FIG. 2 is a fragmentary, sectional view taken along plane II—II in FIG. 1.
Figure 3:
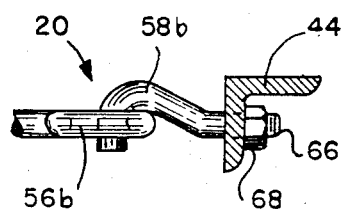
FIG. 3 is a fragmentary, sectional view taken along plane III—III in FIG. 2.

Hinge assembly 20 (FIGS. 1 and 2) pivotally supports extendable grate 14 within firebox 12 to be pivotal in a generally vertical plane. Hinge assembly 20 (FIG. 2) includes a pair of eye bolts 56a and 56b secured within firebox wall 28 and a pair of hooks 58a and 58b anchored within angle iron 44 and pivotally supported on eye bolts 56a and 56b, respectively (see also FIG. 3). Anchor bar 60 comprising outer telescoping half 60a and inner telescoping half 60b provides support for eye bolts 56 within firebox wall 28. Each of eye bolts 56 includes a threaded shaft portion 62 extending through firebox wall 28 and anchor bar 60 and secured therein using hex nut 64. Similarly, each of hooks 58 includes a threaded shaft 66 extending through angle iron 44 and secured therein using hex nut 68 (see FIG. 3). Hooks 58 are pivotable within eye bolts 56 so that extendable grate 14 is free to pivot in a generally vertical plane.

Scale 16 (FIGS. 5 and 6) is a spring-loaded scale of any type generally well-known in the art. The scale includes slide tube 70, arm 72 slidably supported therein, spring 74, and teeter bar 76. Slide tube 70 is generally cylindrical in cross section and includes lower closed end 78 and upper open end 80. Longitudinal slit 82 extends from open end 80 approximately three-quarters of the length of slide tube 70 towards closed end 78. Arms 83 are secured to firebox wall 32 using screws 85 and support slide tube 70 in spaced relation to the wall to alleviate the effect of heat on spring 74. Arm 72 is slidably positioned within slide tube 70 and includes upper end 84 and pointer finger 86 protruding generally perpendicularly through slit 82. Spring 74 is secured to lower tube end 78, for example by welding, and looped over finger 86 to bias or draw finger 86 downwardly within tube 70. Hash marks 88 are printed on firebox wall 32 or on tube 70, and pointer 86 registers with the hash marks to provide an indication of the weight exerted upwardly on arm 72.

Teeter 76 is supported through wall 32 on teeter plate 90 (FIGS. 1, 5 and 6) which is in turn secured to wall 32 using screws 91. Firebox wall 32 defines aperture 92, and teeter plate 90 defines vertical slit 94 which aperture and slit are aligned so that teeter bar 76 can extend therethrough. Scale end 76b of teeter bar 76 is pivotally connected to upper end 84 of slide bar 72 using bolt 96. Arm 54 on grate 14 rests on stove end 76a of teeter bar 76 so that the weight of grate 14 exerts a downward force on teeter bar end 76a to draw slide arm 72 upwardly against the biasing force of spring 74. Therefore, the weight of grate 14 and any solid fuel supported thereon may be read via the registration of finger 86 with hash marks 88.

Signal apparatus 18 (FIG. 5) generally comprises dial unit 22 and light/beeper 98. Dial unit 22 in turn comprises housing 100 secured to firebox wall 32 using four screws 102. Shaft 104 (FIG. 6) extends generally perpendicularly from and is rotatably supported within housing 100. Knob 106 is mounted on the end of shaft 104 so that the shaft may be easily rotated by grasping the knob. Arm 108 extends radially from shaft 104 to be enegageable by finger 86. Housing 100 houses a conventional switch (not shown) electrically connected through wires 110 to light/buzzer 98, so that the closing of the switch will illuminate the light 24 and beeper 25. The switch in housing 100 is responsive to rotary movement of shaft 104 such that when shaft 108 is engaged and moved by finger 86 the switch closes. The switch remains open when arm 108 is not engaged by finger 86.

INSTALLATION AND OPERATION

Kit 10 is sold in kit form including grate 14, scale 16, signal apparatus 18, and hinge assembly 20. To install kit 10, the homeowner must first remove the existing grate (not shown) within firebox 12. Kit 10 is then installed by mounting the various elements on firebox 12. Although one preferred sequence of installation will be described herein, the order in which the various elements are secured to firebox 12 is not important.

Aperture 92 must be formed in firebox wall 32, for example by drilling, punching, or cutting. Teeter plate 90 is then aligned with aperture 92 and secured to firebox wall 32 using screw 91. Scale 16 is mounted on firebox wall 32 using screws 85 so that upper end 84 of slide arm 72 is generally parallel with apertures 92 and 94. Teeter bar 76 is inserted through apertures 92 and 94 and pivotally secured to arm 72 using bolt 96.

Dial unit 22 is mounted on firebox wall 32 using screws 102 and positioned so that arm 108 is engageable by finger 86 throughout the vertical movement of the finger. Light 24 and beeper 25 are mounted in any convenient place within the house, for example the family room or a bedroom, and connected to housing 100 using wire 110. Optionally, only light 24 or beeper 25 may be used as desired by the homeowner to provide him with the signal which he desires to receive when the wood stove requires replenishment.

Hinge assembly 20 is utilized to pivotally support grate 14 within firebox 12. Eye bolts 56 are installed within firebox wall 28 and supporting bar 60 at generally the same height as teeter bar 76. Hex nuts 64 are secured on eye bolts 56 to anchor the eye bolts in position. Hooks 58 are similarly mounted within angle iron 44 of grate 14. Grate 14 may then be supported within firebox 12 by placing hooks 58 in eye bolts 56 and telescoping the grate as necessary so that arm 54 rests on teeter bar end 76a.

When installed as described, scale 16, and more particularly finger 86, is responsive to the weight of grate 14 and any solid fuel supported thereon. Grate 14, when heavily loaded, exerts a relatively large force downwardly on teeter bar 76 to draw finger 86 upwardly in slide tube 70 to register the weight of the loaded grate. As the solid fuel supported on grate 14 is consumed, the products of combustion go up the flue, and ash drops through grate 14, such that the weight on the grate lessens. Therefore, as the wood burns, finger 86 drops within slide tube 70 under the biasing force of spring 74 until, if not restoked, wood no longer remains on the grate, whereupon the finger will register with the zero designation on hash marks 88.

Figure 5:
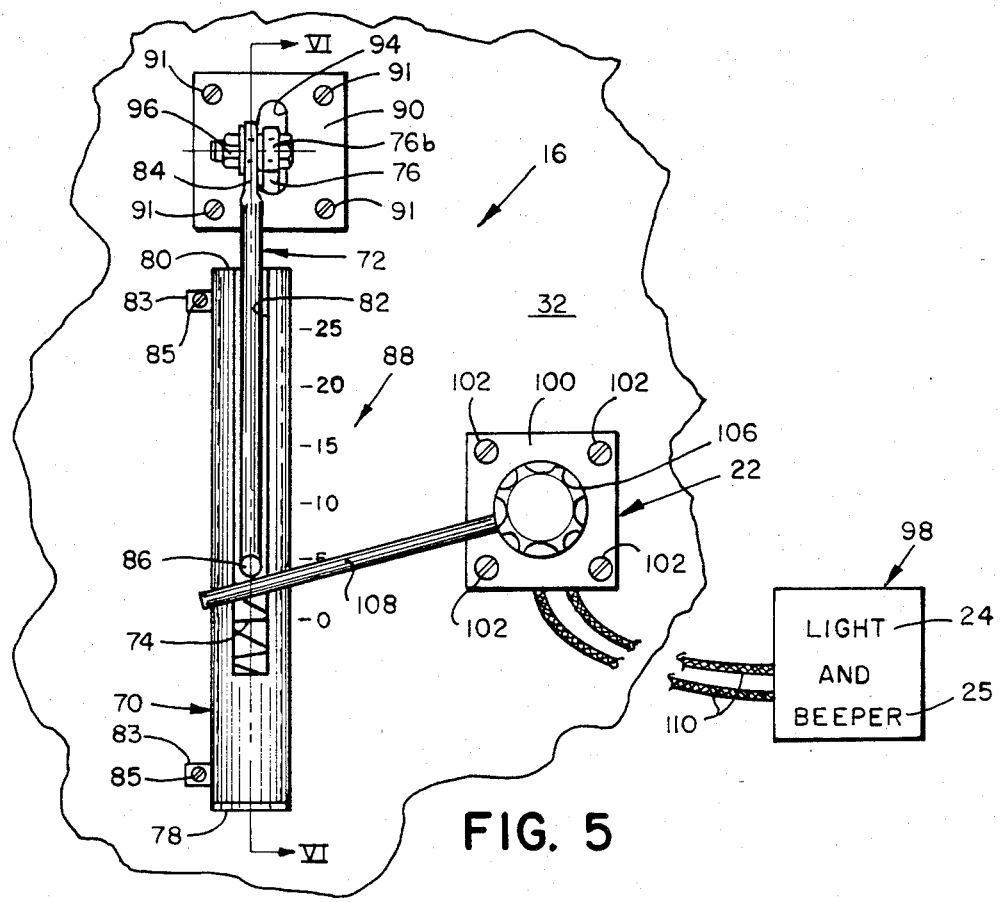
FIG. 5 is an enlarged, fragmentary, elevational view of the scale and signal device.
Figure 6:
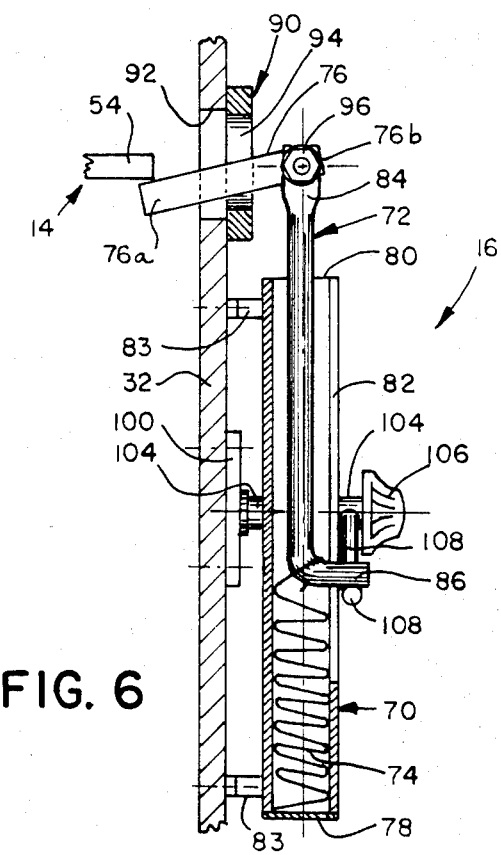
FIG. 6 is a fragmentary, sectional view taken along plane VI—VI in FIG. 5.

Kit 10, installed as described above, is ready for use. Wood is introduced into firebox 12, placed on grate 14, more particularly on straps 46 and 52, and ignited. When grate 14 is so loaded, finger 86 (FIGS. 5 and 6) will be drawn upwardly within slit 82 under the drawing force of teeter bar 76. For example, if 20 pounds of wood were loaded on grate 14, finger 86 would be drawn upwardly until approximately horizontal with the 20 designation on hash marks 88. At this time, the homeowner selects the minimum amount of wood to be remaining on grate 14 when replenishment or restoking is required. For example, if the wood is dry, perhaps 5 pounds of wood on grate 14 will be sufficient to ignite additional wood loaded into firebox 12. On the other hand, if the wood is wet and/or green, perhaps 10 pounds of wood remaining on grate 14 is required to ignite additional wood. After determining how much wood should be left upon restoking, the homeowner grasps knob 106 and rotates shaft 104 until arm 108 is aligned with the desired designation on hash marks 88 to indicate the minimum amount of wood on grate 14 required to actuate signal mechanism 18. Arm 108 as illustrated in FIGS. 5 and 6 is set to provide a signal when the weight of the remaining wood in firebox 12 is approximately 5 pounds.

As the fire burns, the products of combustion pass upwardly through the flue (not shown) and the ash drops through grate 14 onto floor 26. Therefore, the weight of the wood on grate 14 continually lessens, and finger 86 is drawn downwardly within slide tube 70 under the biasing force of spring 74. Eventually, finger 86 will engage arm 108 at the selected weight such that the switch (not shown) in housing 100 completes the circuit through light 24 and beeper 25 to signal to the homeowner that the wood stove requires additional wood. Upon receiving the signal, the homeowner proceeds to the wood stove and introduces additional wood into firebox 12 to prevent the fire from burning out.

The above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A solid fuel burning device comprising:
   a firebox including first and second generally opposite walls;
   a grate for supporting fuel, said grate being extendable between first and second ends, said grate including a first grate half including a pair of parallel side members and a plurality of fuel supporting members extending therebetween, said grate further including a second grate half including a pair of parallel side members and a plurality of fuel supporting members extending therebetween, said second grate half side members being telescopically received within said first grate half side members, said fuel supporting members of both grate halves being concave upwardly;
   hinge means for pivotally supporting said first grate end adjacent said first firebox wall for movement in a generally vertical plane;
   a spring-loaded scale including attaching means for attaching said scale to the exterior of said second firebox wall;
   coupling means adapted to extend through said second firebox wall for coupling said second grate end and said scale, whereby said scale is responsive to the weight of said grate and any fuel supported thereon; and
   signal means responsive to said scale for emitting a signal when said scale indicates that said grate and any fuel supported thereon has attained a predetermined minimum weight, whereby said signal means is actuated when said firebox must be reloaded to prevent the fire from burning out.

2. A solid fuel burning device as defined in claim 1 wherein said signal means comprises adjustment means for altering said predetermined minimum weight to alter the weight of said grate at which said signal is emitted.

3. A solid fuel burning device as defined in claim 2 wherein said scale includes a finger the position of which is responsive to said weight of said grate; and wherein said adjustment means comprises a dial and an arm extending radially from said dial and engageable by said finger at said predetermined grate weight, said dial being rotatable to select said predetermined grate weight at which said arm is engaged by said finger.

4. A solid fuel burning device as defined in claim 3 wherein said coupling means comprises:
   a teeter having first and second opposite ends, said teeter being supported by said second wall;
   means for coupling said second teeter end to said scale; and
   said first teeter end supporting said second grate end.

5. A solid fuel burning device as defined in claim 4 wherein said hinge means comprises:
   a plurality of eye bolts secured in said first firebox wall; and
   a plurality of hooks supported by said first grate end and pivotally received in said eye bolts.

6. A solid fuel burning device as defined in claim 5 wherein said signal means is located remotely from said firebox.

7. A solid fuel burning device as defined in claim 1 wherein said signal means is located remotely from said firebox.

8. A solid fuel burning device as defined in claim 7 wherein said signal device comprises a device for emitting an audible signal.

9. A solid fuel burning device as defined in claim 1 wherein said coupling means comprises:
   a teeter having first and second opposite ends, said teeter being supported by said second wall;
   means for coupling said second teeter end to said scale; and
   said first teeter end supporting said second grate end.

10. A fuel weighing grate kit for installation in a solid fuel burning firebox having first and second generally opposite walls, said kit comprising:
    a scale responsive to a force exerted thereon, said scale including securing means for securing said scale to the exterior of the second firebox wall;
    a solid fuel supporting grate to be supported within said firebox between the first and second walls, said grate including first and second generally opposite ends, said grate being extendable between said ends to adapt to a variety of different size fireboxes, said grate including a first grate half including a pair of parallel side members and a plurality of fuel supporting members extending therebetween, said grate further including a second grate half including a pair of parallel side members and a plurality of fuel supporting members extending therebetween, said second grate half side members being telescopically received within said first grate half side members, said fuel supporting members of both grate halves being concave upwardly;
    hinge means for pivotally supporting said first grate end adjacent the first wall for movement in a generally vertical plane;
    connecting means for connecting said second grate end to said scale, whereby said scale is responsive to the weight of said grate and any solid fuel supported thereon; and
    signal means responsive to said scale for emitting a signal when said scale is indicative of a predetermined minimum grate weight, whereby a signal is emitted when and only when said grate requires reloading.

11. A fuel weighing grate kit as defined in claim 10 wherein said signal means comprises a device for emitting an audible signal.

12. A fuel weighing grate kit as defined in claim 10 wherein said signal means comprises adjustment means for altering said predetermined grate weight at which said signal is emitted.

13. A fuel weighing grate kit for installation in a solid fuel burning firebox having first and second generally opposite walls, said kit comprising:
    a scale responsive to a force exerted thereon, said scale including securing means for securing said scale to the exterior of the second firebox wall;
    a solid fuel supporting grate to be supported within said firebox between the first and second walls, said grate including first and second generally opposite ends, said grate being extendable between said ends to adapt to a variety of different size fireboxes, said grate including a first grate half including a pair of parallel side members and a plurality of fuel supporting members extending therebetween, said grate further including a second grate half including a pair of parallel side members and a plurality of fuel supporting members extending therebetween, said second grate half side members being telescopically received with said first grate half side members, said fuel supporting members of both grate halves being concave upwardly;
    hinge means for pivotally supporting said first grate end adjacent the first wall for movement in a generally vertical plane; and
    connecting means for connecting said second grate end to said scale, whereby said scale is responsive to the weight of said grate and any solid fuel supported thereon.

* * * * *